United States Patent
Higgins

(12) 
(10) Patent No.: US 10,621,445 B2
(45) Date of Patent: Apr. 14, 2020

(54) VEHICLE VIDEO SYSTEMS INCLUDING REAR MOUNTED VIDEO CAMERAS

(71) Applicant: Toyota Motor Engineering & Manufacturing North America, Inc., Erlanger, KY (US)

(72) Inventor: Christopher M. Higgins, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 119 days.

(21) Appl. No.: 15/196,856

(22) Filed: Jun. 29, 2016

(65) Prior Publication Data

US 2018/0001820 A1 Jan. 4, 2018

(51) Int. Cl.
| | |
|---|---|
| *B60R 1/00* | (2006.01) |
| *B62D 33/027* | (2006.01) |
| *G06K 9/00* | (2006.01) |
| *B60R 11/04* | (2006.01) |
| *B60R 11/00* | (2006.01) |

(52) U.S. Cl.
CPC .......... *G06K 9/00791* (2013.01); *B60R 11/04* (2013.01); *B62D 33/0273* (2013.01); *B60R 2011/004* (2013.01); *B60R 2011/0082* (2013.01); *B60R 2011/0085* (2013.01)

(58) Field of Classification Search
CPC ......... H60R 1/00; G06K 9/00; B62D 33/0273
USPC ...................................................... 348/148
See application file for complete search history.

(56) References Cited

U.S. PATENT DOCUMENTS

| | | | |
|---|---|---|---|
| 5,586,620 A * | 12/1996 | Dammeyer ........... | B66F 9/0755 187/227 |
| 9,227,568 B1 * | 1/2016 | Hubbell ................. | B60R 1/081 |
| 9,288,446 B2 | 3/2016 | Mokashi et al. | |
| 2003/0090569 A1 * | 5/2003 | Poechmueller ...... | B60Q 1/0023 348/148 |
| 2013/0076007 A1 | 3/2013 | Goode et al. | |

(Continued)

FOREIGN PATENT DOCUMENTS

| | | |
|---|---|---|
| JP | 2007131252 | 5/2007 |
| KR | 20090123373 | 4/1996 |
| WO | WO2004012962 | 2/2004 |

OTHER PUBLICATIONS http://consumerguide.com/used/2007-12-chevrolet-avalanche, undated.

(Continued)

*Primary Examiner* — Hee-Yong Kim
(74) *Attorney, Agent, or Firm* — Dinsmore & Shohl LLP

(57) ABSTRACT

A vehicle includes a vehicle body that has a cabin area and a cargo area including a truck bed assembly. A tailgate assembly is pivotally connected to the truck bed assembly at a location between a pair of tailgate posts, the tailgate assembly being moveable between a raised configuration and a lowered configuration. A vehicle video system includes a first rear video camera that captures a first field of view at least partially rearward of a rear bumper assembly of the vehicle body with the tailgate assembly in the raised configuration and a second rear video camera that captures a second field of view rearward of the tailgate assembly with the tailgate assembly in the lowered configuration.

12 Claims, 8 Drawing Sheets

(56) References Cited

U.S. PATENT DOCUMENTS

2015/0183380 A1     7/2015   Deppo et al.
2016/0259970 A1*   9/2016   Wee .................. G06K 9/00885

OTHER PUBLICATIONS http://www.rearviewsafety.com/license-plate-backup-camera-model-rvw-0350-2.html, undated.

* cited by examiner

VEHICLE VIDEO SYSTEMS INCLUDING REAR MOUNTED VIDEO CAMERAS

TECHNICAL FIELD

The present specification generally relates to vehicle video systems and, more specifically, to vehicle video systems including a rear mounted video camera that are capable of providing a back-up camera with a vehicle tailgate in either a raised configuration or a lowered configuration.

BACKGROUND

Load carrying vehicles, such as trucks, often have folddown tailgates. Folded down, the tailgates extend the area of the truck bed. Folded up, the tailgates close off the truck bed. It is known to provide tailgates with restraining devices for controlling lowering of the tailgates. As one example, cables may be provided to limit rotation of the tailgates thereby setting the lowered position of the tailgates at horizontal. The cables may be attached to the tailgates at one end and attached to sidewalls of the truck body at opposite ends.

Some trucks have rear mounted video cameras to provide an image at a rear of the truck. However, the rear mounted cameras that are mounted to the tailgate, rotate with the tailgate between the raised and lowered configurations. This repositioning of the video camera can change the optical axis of the camera from pointing rearward, beyond the tailgate with the tailgate in the raised position to underneath and even forward of the tailgate with the tailgate in the lowered position.

Accordingly, a need exists for vehicle video systems that can provide a suitable rear view behind the vehicles with a tailgate in both raised and lowered positions.

SUMMARY

In one embodiment, a vehicle includes a vehicle body that has a cabin area and a cargo area including a truck bed assembly. A tailgate assembly is pivotally connected to the truck bed assembly at a location between a pair of tailgate posts. The tailgate assembly is moveable between a raised configuration and a lowered configuration. A vehicle video system includes a first rear video camera that captures a first field of view at least partially rearward of a rear bumper assembly of the vehicle body with the tailgate assembly in the raised configuration and a second rear video camera that captures a second field of view rearward of the tailgate assembly with the tailgate assembly in the lowered configuration.

In another embodiment, a vehicle includes a vehicle body that has a cabin area and a cargo area including a truck bed assembly. A tailgate assembly is pivotally connected to the truck bed assembly at a location between a pair of tailgate posts. The tailgate assembly is moveable between a raised configuration and a lowered configuration. A vehicle video system includes a rear video camera located at one of the pair of tailgate posts. The rear video camera provides a field of view that captures an outer edge of the tailgate assembly with the tailgate assembly in the lowered configuration.

In yet another embodiment, a vehicle includes a vehicle body that has a cabin area and a cargo area including a truck bed assembly. A tailgate assembly is pivotally connected to the truck bed assembly at a location between a pair of tailgate posts. The tailgate assembly is moveable between a raised configuration and a lowered configuration. A vehicle video system includes a rear video camera connected to the tailgate assembly. A field of view altering device provides a predetermined field of view for the rear video camera that is directed rearward of the tailgate assembly with the tailgate assembly in the lowered configuration and the rear video camera in the tailgate lowered position. At least one of the rear video camera and the field of view altering device is moveable between a tailgate raised position and a tailgate lowered position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles and methods utilizing vehicle video systems that include a rear mounted video camera apparatus that are capable of providing a back-up camera view with a vehicle tailgate assembly in either a raised configuration or a lowered configuration. As one example, a stationary rear mounted video camera apparatus may be mounted offset from the vehicle tailgate assembly. The stationary rear mounted video camera apparatus may have a predetermined field of view (FOV) large enough to capture an area behind the a rear bumper structure with the vehicle tailgate assembly in a raised configuration and behind the vehicle tailgate assembly with the vehicle tailgate assembly in a lowered configuration. In some embodiments, multiple rear mounted video camera apparatuses may be utilized by the vehicle video systems where one rear mounted video camera apparatus is suitable for capturing a predetermined FOV behind the rear bumper structure of the vehicle with the vehicle tailgate assembly in the raised configuration. Another rear mounted video camera apparatus may be provided that is suitable for capturing another predetermined FOV behind the vehicle tailgate assembly with the vehicle tailgate assembly in the lowered configuration. Moveable rear mounted video camera apparatuses may be provided, in some embodiments, whose FOV can be adjusted depending on the vehicle tailgate assembly being in the raised or lowered configuration and the mounting location of the moveable video camera apparatuses.

Figure 1:
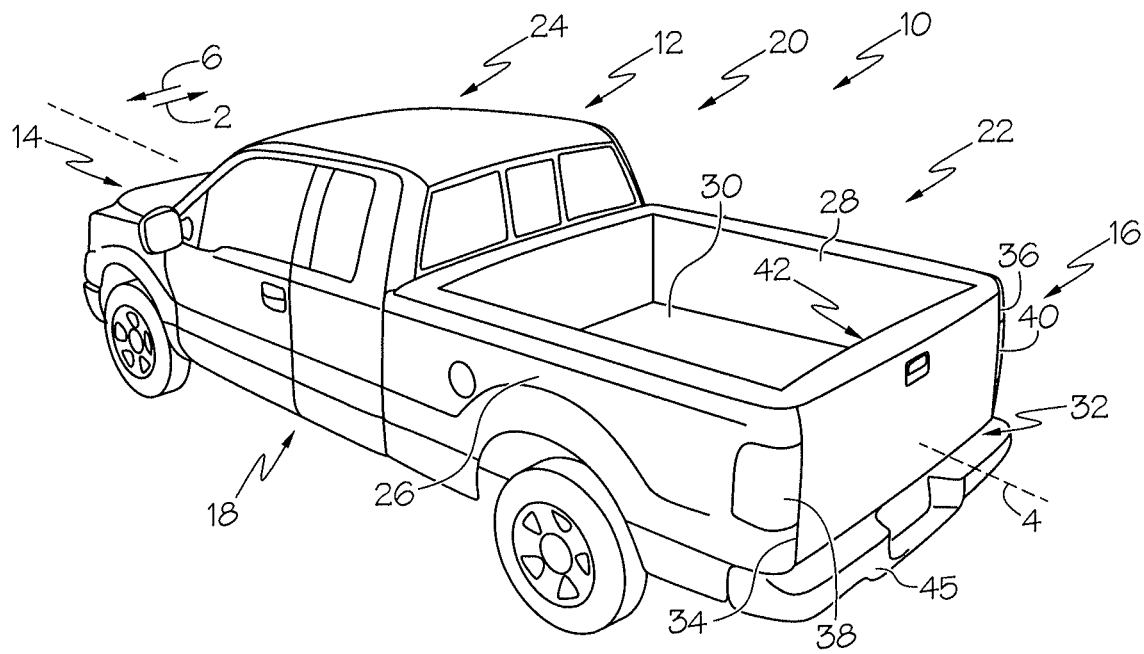
FIG. 1 is a perspective view of a vehicle including a vehicle video system, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Referring to FIG. 1, the vehicle 10 includes a vehicle body 12 having a front 14, a rear 16 and sides 18 and 20 that extend between the front 14 and the rear 16 in the vehicle longitudinal direction. In the illustrated embodiment, the vehicle 10 is a truck including a cargo area 22 that is formed rearward of a cabin area 24 by sidewalls 26 and 28, floor 30 and a tailgate assembly 32 that is located between tailgate posts 34 and 36. The tailgate posts 34 and 36 may include taillights 38 and 40 and latch components (e.g., strikers) that can releasably connect to the tailgate assembly 32 for releasably latching the tailgate assembly 32 in a raised configuration, as shown. The tailgate assembly 32 may include a tailgate handle assembly 42 that can be used to release the tailgate assembly 32 from the latch components in order to place the tailgate assembly 32 in a lowered position (represented by dashed lines). In the lowered position, the floor 30 may be extended outward beyond a vehicle rear bumper assembly 45 and increased access to the cargo area 22 can be provided. In some embodiments, the tailgate assembly 32 may be removable from the cargo area 22.

Figure 2:
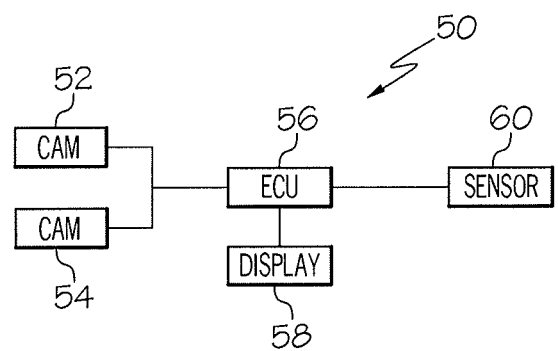
FIG. 2 is a schematic view of a vehicle video system of use with the vehicle of FIG. 1, according to one or more embodiments shown and described herein.

Referring to FIG. 2, the vehicle 10 includes a vehicle video system 50 that includes one or more front video cameras 52 and one or more rear video cameras 54 that are connected to an electronic control unit 56 (ECU) that provides image processing and memory storage capabilities. The term "video" refers to a series of captured images within a FOV of the video camera. The ECU 56 may be connected to a display unit 58 that receives video processed by the ECU 56 based on video images that are captured by the front and rear video cameras 52 and 54. The display unit 58 can display, for example, streaming video (live and/or recorded) from one or both of the front and rear video cameras 52 and 54. The display unit 58 may have a response time, which is the amount of time that passes between activation of the vehicle video system 50 or some other image capture initiation event (e.g., setting a reverse gear) and the display of the required FOV by the display unit 58. The display unit 58 can be at least one of a heads-up display, an instrument cluster display, and a mobile device display. In some embodiments, the vehicle 10 may have a plurality of displays. In such embodiments, the vehicle 10 could also have a plurality of different types of displays. For example, and not as a limitation, the vehicle 10 could have an in-dashboard display and a heads-up display for displaying information directly on a windshield or other window.

One or more sensors 60 may be connected to the ECU 56. The sensors 60 may be any number of sensor types, such as a tailgate position sensor, a speed sensor, a transmission sensor, a motion sensor, etc. The tailgate position sensor may, for example, provide a signal that is received by the ECU 56 that is indicative of an angular position of the tailgate assembly 32. In some embodiments, the tailgate position sensor may provide a signal that is received by the ECU 56 that is indicative of whether the tailgate assembly 32 is in the raised or lowered configuration. The ECU 56 may operate the front and rear video cameras 52 and 54 based on input from the tailgate position sensor. The speed sensor may provide a signal that is received by the ECU 56 that is indicative of a speed of the vehicle 10. The ECU 56 may operate the front and rear video cameras 52 and 54 based on input from the speed sensor (e.g., the ECU 56 may activate the front and/or rear video camera 52 and 54 if travelling at or below a predetermined speed). The transmission sensor may provide a signal that is received by the ECU 56 that is indicative of a transmission state. The ECU 56 may operate the front and rear video cameras 52 and 54 based on input from the transmission sensor. For example, the ECU 56 may activate the rear video camera 54 with the transmission set to reverse. The motion sensor may provide a signal that is received by the ECU 56 that is indicative of a movement. The ECU 56 may operate the front and rear video cameras 52 and 54 based on input from the motion sensor.

The ECU 56 may include an image processor that processes video images captured by the front and rear video cameras 52 and 54. The image processor may include logic that provides the video images to the display unit 58 in a fashion for display thereby. The ECU may also include other components, such as input and output interface circuits and memory. The ECU 56 may also be configured to process the video images for reasons other than display, such as object recognition, impact warning and avoidance, etc.

Figure 3:
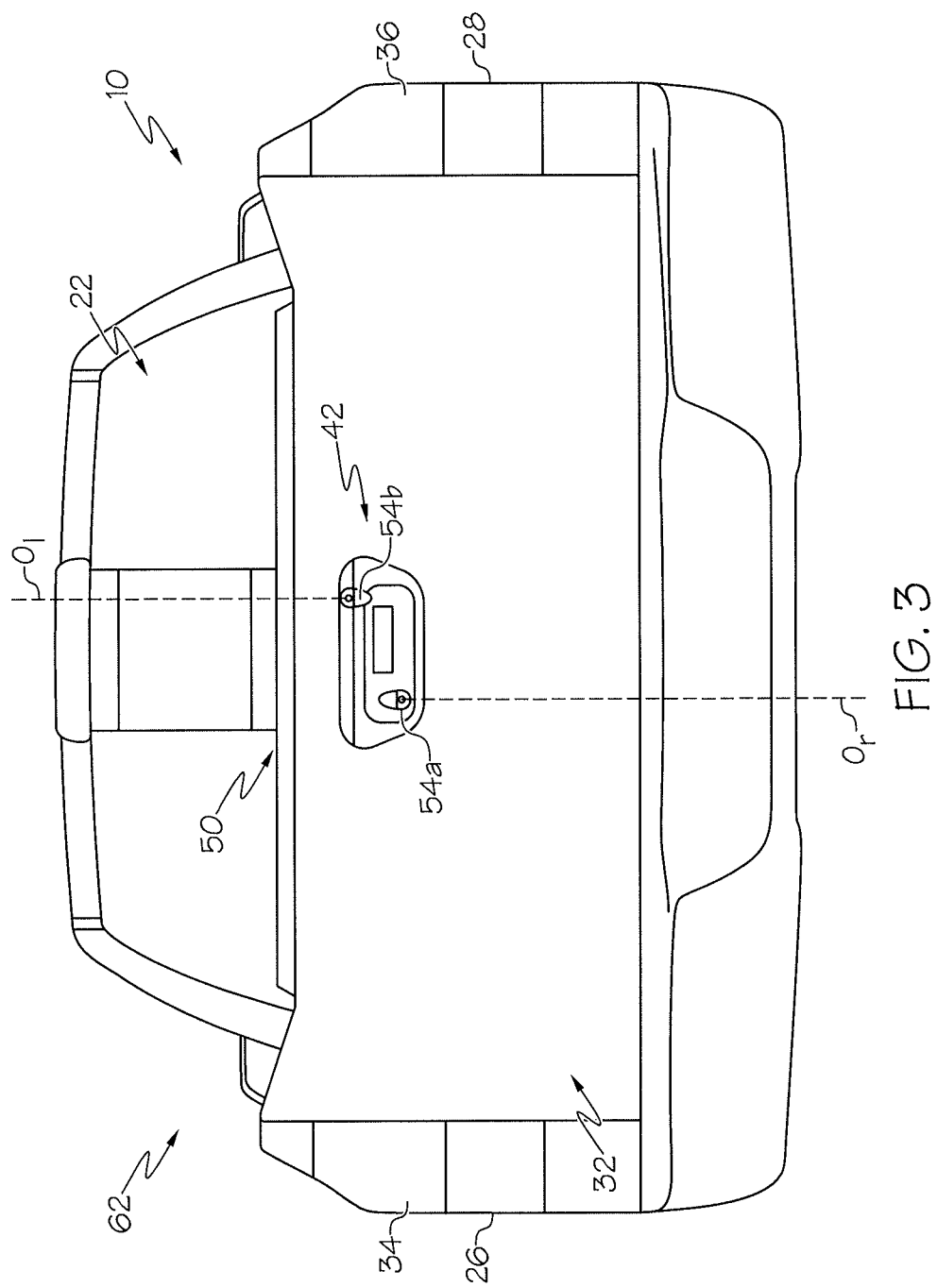
FIG. 3 is a rear view of the vehicle of FIG. 1 with a tailgate assembly in a raised configuration, according to one or more embodiments shown and described herein.

Referring to FIG. 3, in an embodiment, the vehicle 10, in the form of the pickup truck, has the cargo area 22 with truck bed assembly 62 that includes the sidewalls 26 and 28, the tailgate posts 34 and 36 and the tailgate assembly 32 that can be moved between raised and lowered configurations. FIG. 3 illustrates the tailgate assembly 32 in the raised configuration, latched with the tailgate posts 34 and 36 that are fixed in their illustrated locations. The tailgate assembly 32 includes the tailgate handle assembly 42 that can be used to release the tailgate assembly 32 from latch components of the tailgate posts 34 and 36.

The vehicle video system 50 includes a tailgate raised video camera 54a and a tailgate lowered video camera 54b.

Figure 4:
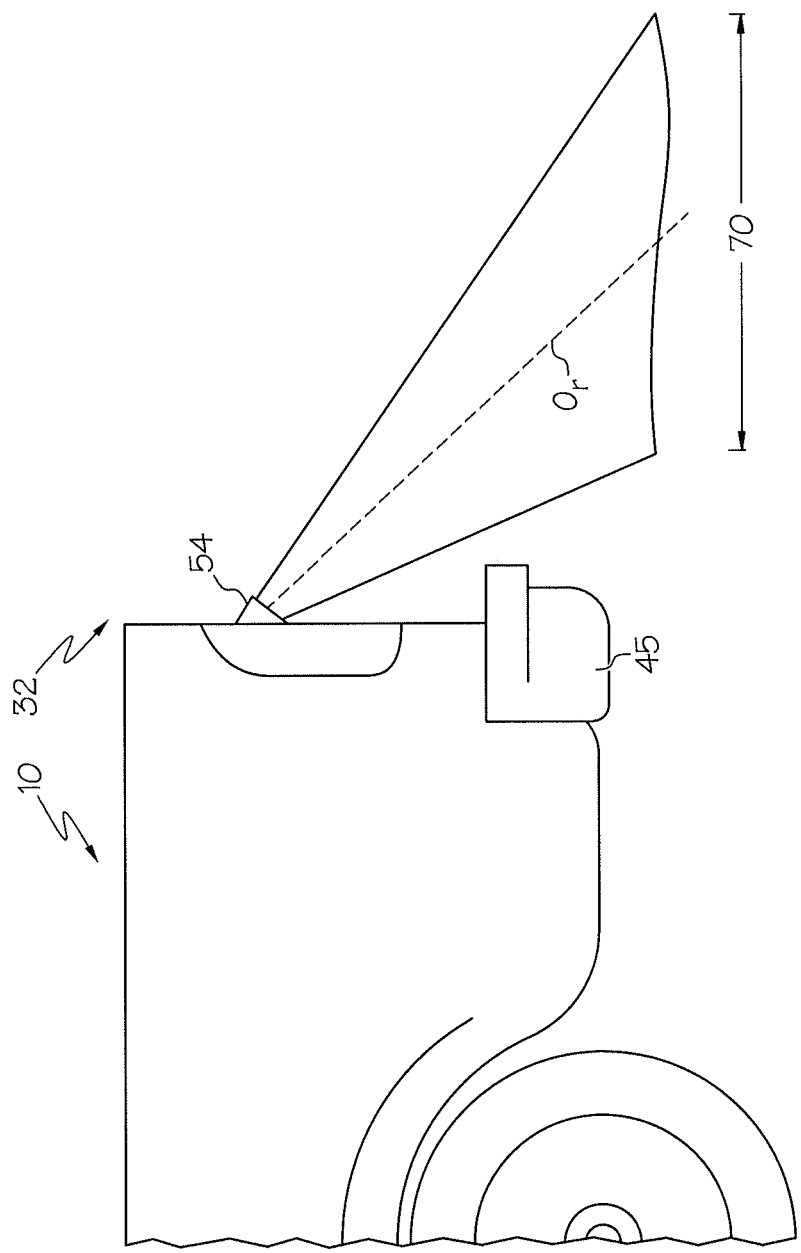
FIG. 4 is a side view of the vehicle of FIG. 1 with the tailgate assembly in the raised configuration, according to one or more embodiments shown and described herein.

In the illustrated embodiment, the tailgate raised video camera 54a and the tailgate lowered video camera 54b may be associated with the tailgate handle assembly 42, but the tailgate raised video camera 54a and the tailgate lowered video camera 54b may be located elsewhere on the tailgate assembly 32. Referring to FIG. 4, the tailgate raised video camera 54a has an optical axis $O_r$ that is directed generally downward in the vehicle vertical direction and rearward in the vehicle longitudinal direction with the tailgate assembly 32 in the raised configuration thereby providing a FOV 70 located rearward of the vehicle rear bumper assembly 45. In some embodiments, the FOV 70 of the tailgate raised video camera 54a may not capture the vehicle rear bumper assembly 45, but in other embodiments, at least a portion of the vehicle rear bumper assembly 45 is located in the FOV 70. As indicated above, the ECU 56 may determine that the tailgate assembly 32 is in the raised configuration and activate the tailgate raised video camera 54a upon a preselected camera activation event.

Figure 5:
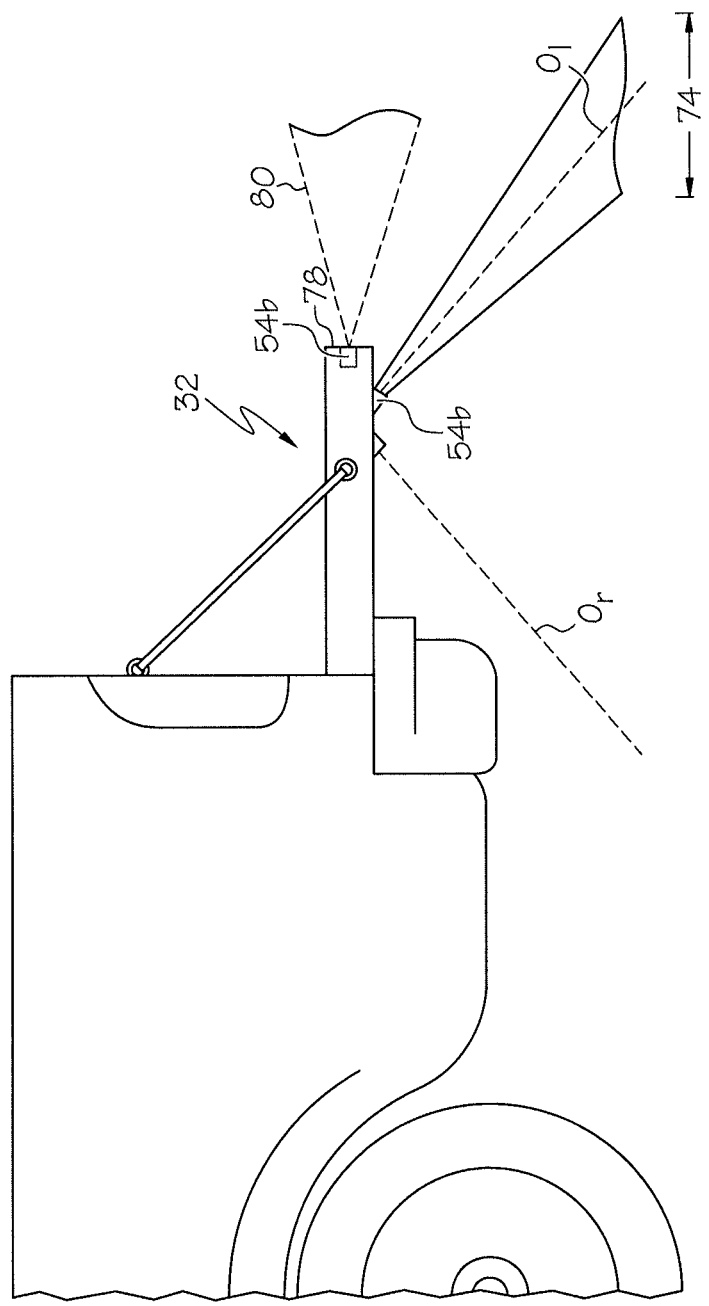
FIG. 5 is a side view of the vehicle of FIG. 1 with the tailgate assembly in a lowered configuration, according to one or more embodiments shown and described herein.

Referring again to FIG. 3, the vehicle video system 50 further includes the tailgate lowered video camera 54b. In the illustrated embodiment, the tailgate lowered video camera 54b may be associated with the tailgate handle assembly 42. Referring also to FIG. 5, the tailgate lowered video camera 54b has an optical axis $O_l$ that is offset from the optical axis $O_r$ such that the optical axis $O_l$ is directed generally downward in the vehicle vertical direction and rearward in the vehicle longitudinal direction thereby providing a FOV 74 that is located rearward of the tailgate assembly 32 with the tailgate assembly 32 in the lowered configuration. As can be seen, the FOV 74 provided by the tailgate lowered video camera 54b is different from the FOV 70 of the tailgate raised video camera 54a. In particular, the FOV 74 of the tailgate lowered video camera 54b with the tailgate assembly 32 in the lowered configuration is located at least partially rearward of the FOV 70 of the tailgate raised video camera 54a with the tailgate assembly 32 in the raised configuration (FIG. 4). Such an arrangement can allow the tailgate lowered video camera 54b to provide the FOV 74 rearward of the tailgate assembly 32, for example, during a reverse driving operation. As indicated above, the ECU 56 may determine that the tailgate assembly 32 is in the lowered configuration and activate the tailgate lowered video camera 54b upon a preselected camera activation event. FIG. 5 further illustrates an alternative embodiment where a tailgate lowered video camera 54b is located at an outer edge 78 of the tailgate assembly 32 thereby providing a FOV (represented by dashed lines 80) that is located rearward of the tailgate assembly 32 with the tailgate assembly 32 in the lowered configuration.

Figure 6:
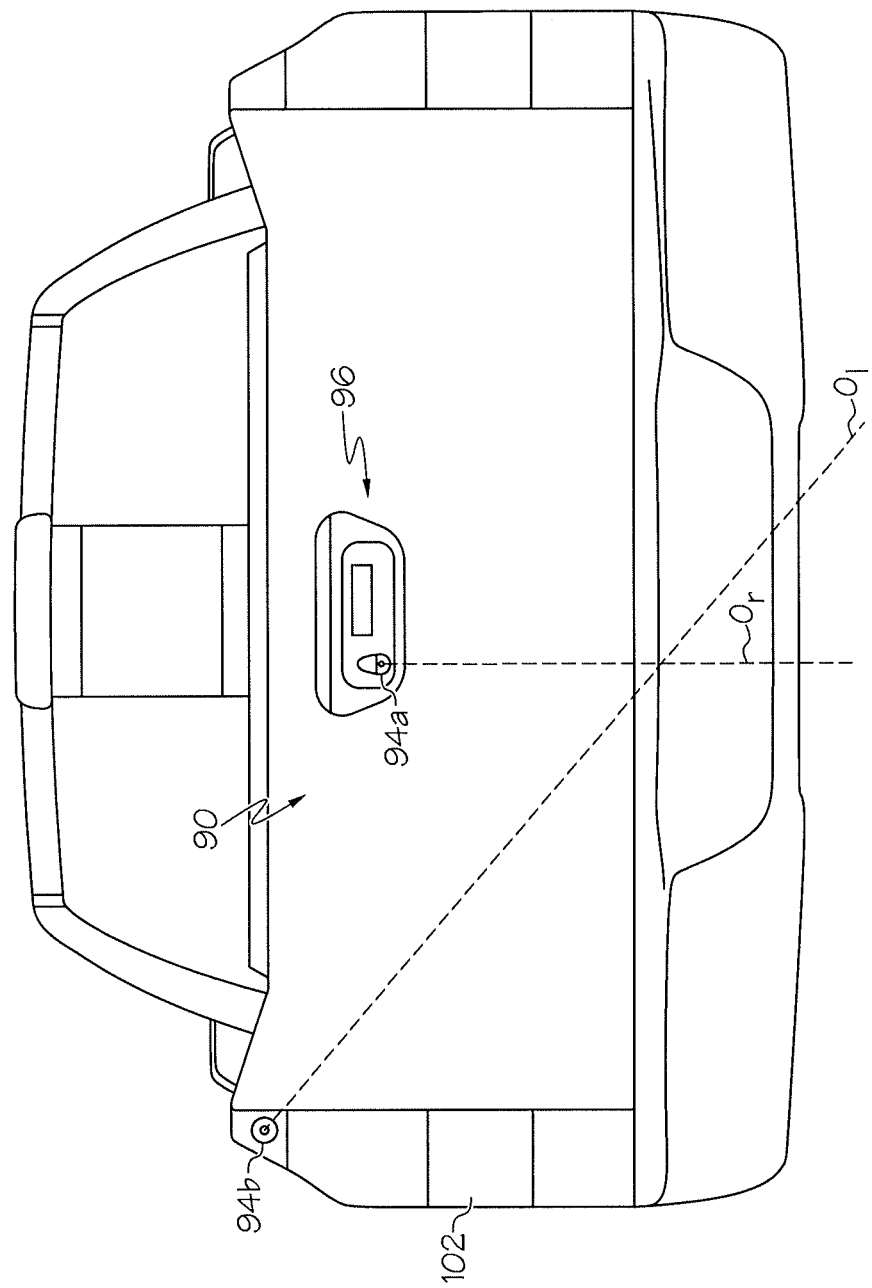
FIG. 6 is a rear view of another vehicle including another vehicle video system, according to one or more embodiments shown and described herein.
Figure 7:
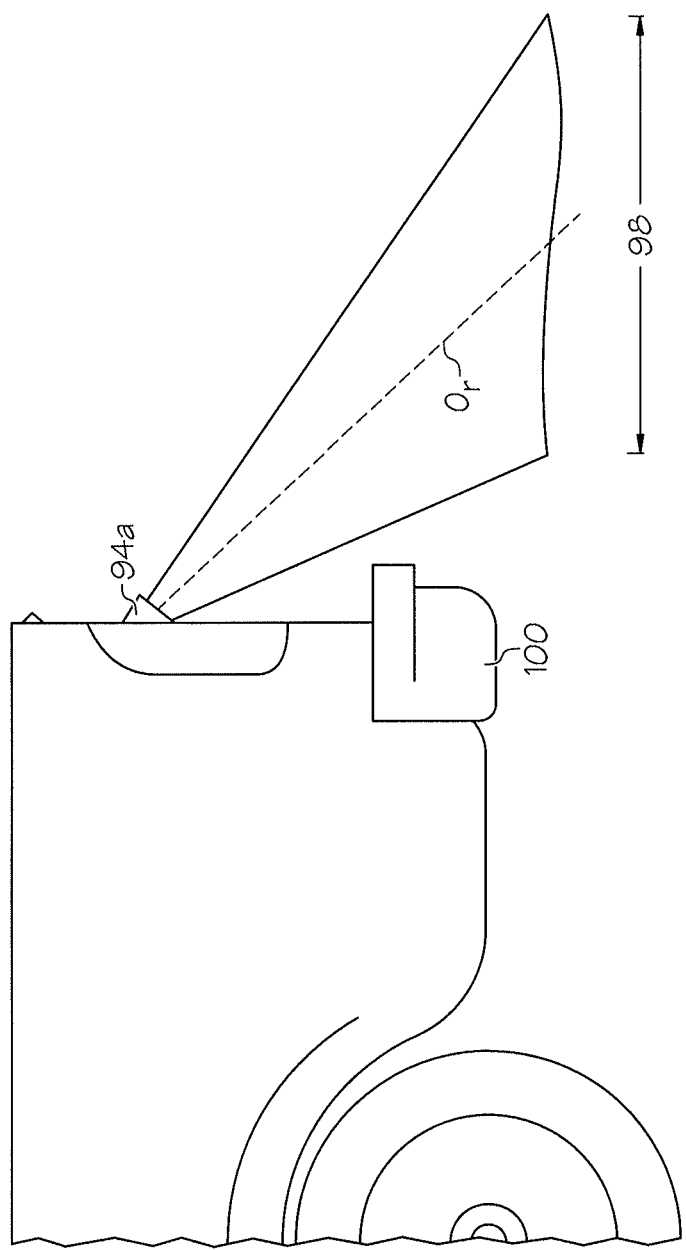
FIG. 7 is a side view of the vehicle of FIG. 6 with a tailgate assembly in a raised configuration, according to one or more embodiments shown and described herein.

Referring to FIG. 6, another embodiment of a vehicle video system 90 includes a tailgate raised video camera 94a and a tailgate lowered video camera 94b. In some embodiments, the vehicle video system 90 may include only the video camera 94b, which can be utilized by the vehicle video system 90 with tailgate assembly 32 in either raised or lowered configurations. In the illustrated embodiment, the tailgate raised video camera 94a may be associated with tailgate handle assembly 96 similar to described above. Referring to FIG. 7, the tailgate raised video camera 94a has an optical axis $O_r$ that is directed generally downward in the vehicle vertical direction and rearward in the vehicle longitudinal direction with the tailgate assembly 32 in the raised configuration thereby providing a FOV 98 located rearward of vehicle rear bumper assembly 45. In some embodiments, the FOV 98 of the tailgate raised video camera 94a may not capture the vehicle rear bumper assembly 45, but in other embodiments, at least a portion of the vehicle rear bumper assembly 45 is located in the FOV 98.

Figure 8:
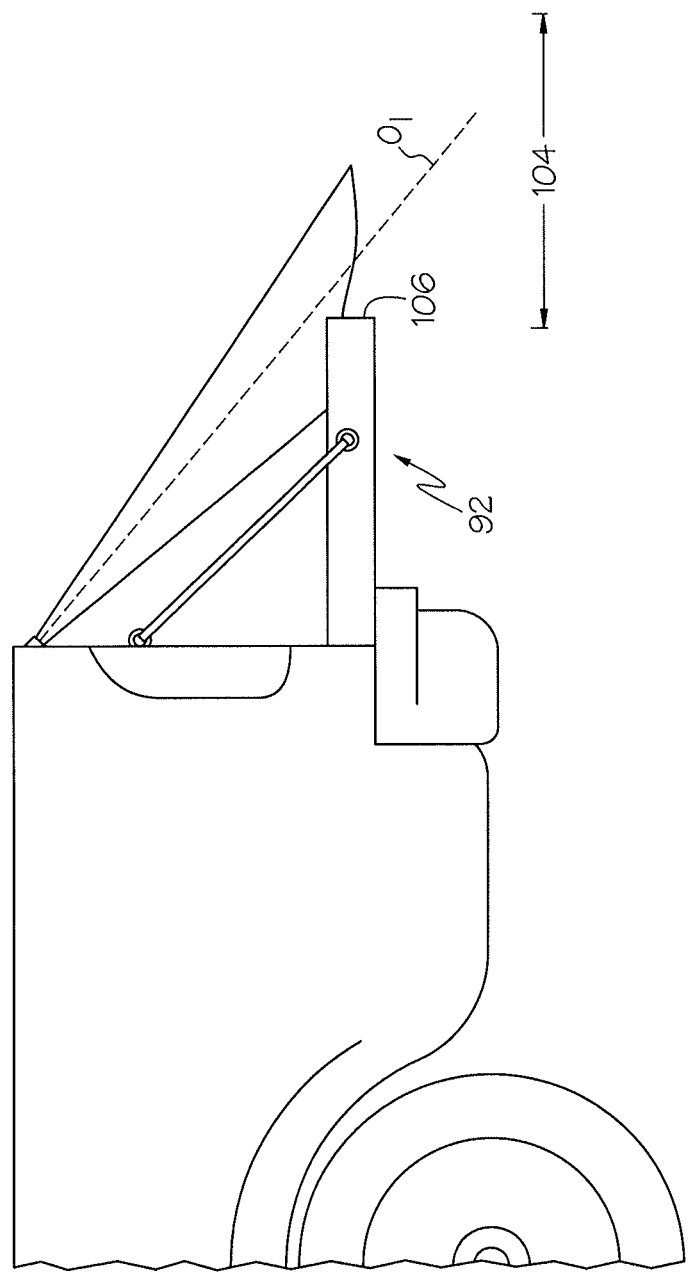
FIG. 8 is a side view of the vehicle of FIG. 6 with the tailgate assembly in a lowered configuration, according to one or more embodiments shown and described herein.

Referring again to FIG. 6, the vehicle video system 90 further includes the tailgate lowered video camera 94b. In the illustrated embodiment, the tailgate lowered video camera 94b may be associated with tailgate post 34. Referring also to FIG. 8, the tailgate lowered video camera 94b has an optical axis $O_l$ that is offset from the optical axis $O_r$ such that the optical axis $O_l$ is directed generally downward in the vehicle vertical direction and rearward in the vehicle longitudinal direction thereby providing a FOV 104 that is located rearward of the tailgate assembly 32 with the tailgate assembly 32 in the lowered configuration. The optical axis $O_l$ may also be directed in the vehicle lateral direction, for example, to be centered along a centerline of the tailgate assembly 32 (FIG. 6).

As can be seen, the FOV 104 provided by the tailgate lowered video camera 94b is different from the FOV 98 of the tailgate raised video camera 94a. In particular, the FOV 104 of the tailgate lowered video camera 94b with the tailgate assembly 32 in the lowered configuration is located at least partially rearward of the FOV 98 of the tailgate raised video camera 94a with the tailgate assembly 32 in the raised configuration (FIG. 7). Such an arrangement can allow the tailgate lowered video camera 94b to provide the FOV 104 rearward of the tailgate assembly 32, for example, during a reverse driving operation. In other embodiments having only the tailgate lowered video camera 94b, the FOV 104 may be provided with an area that is suitable for use with the tailgate assembly 32 in both the raised and lowered configurations. The FOV 104 of the tailgate lowered video camera 94b may be selected to capture outer edge 78 of the tailgate assembly 32, which can provide a visual reference for a driver during a reverse driving operation with the tailgate assembly in the lowered configuration.

Figure 10:
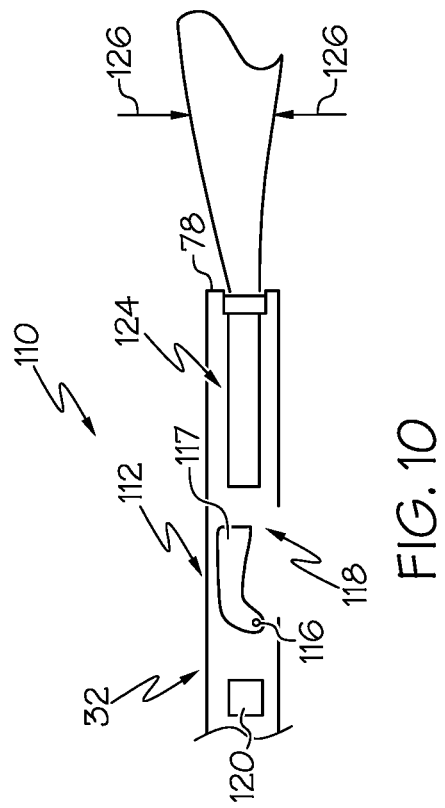
FIG. 10 illustrates the vehicle video system of FIG. 9 with the tailgate assembly in a lowered configuration, according to one or more embodiments shown and described herein.
Figure 9:
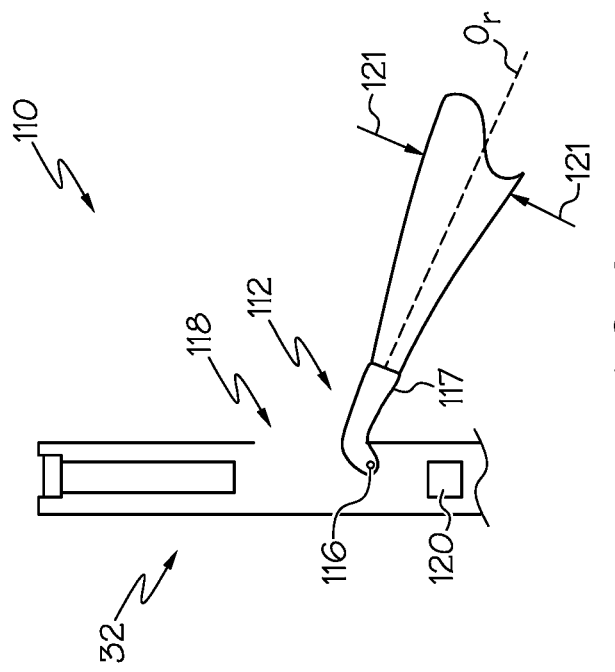
FIG. 9 illustrates another vehicle video system for use with the vehicle of FIG. 1 with the tailgate assembly in a raised configuration, according to one or more embodiments shown and described herein.

While the above-described vehicle video systems utilize fixed video cameras, vehicle video systems may include moveable video cameras whose FOV can be adjusted based on a position of the tailgate assembly to provide a suitable FOV with the tailgate assembly in the raised or lowered configurations. FIGS. 9 and 10 illustrate an exemplary vehicle video system 110 having a moveable tailgate video camera 112 that can be used with tailgate assembly 32 in both raised and lowered configurations. Referring first to FIG. 9, the tailgate video camera 112 is illustrated with the tailgate assembly 32 in the raised configuration. In this example, the tailgate video camera 112 is moveably mounted at a pivot location 116 located within the tailgate assembly 32. The tailgate video camera 112 includes an image directing portion 117 that extends through an opening 118 through the tailgate assembly 32 to provide an optical axis $O_r$ that is directed generally downward in the vehicle vertical direction and rearward in the vehicle longitudinal direction with the tailgate assembly 32 in the raised configuration thereby providing an FOV 121 located rearward of a vehicle rear bumper assembly.

An actuator 120 (e.g., a motor) may be provided that can move the tailgate video camera 112 between tailgate raised and tailgate lowered positions. For example, an ECU similar to that of FIG. 2 can control the actuator 120 based on input from a sensor (e.g., a tailgate position sensor). Referring to FIG. 10, with the tailgate assembly 32 in the lowered configuration, the actuator 120 may move (e.g., rotate) the tailgate video camera 112 to the tailgate lowered position with the image directing portion 117 directed toward the outer edge 78 of the tailgate assembly 32. A lens apparatus 124 or other FOV altering device (e.g., a mirror) may be utilized to provide a predetermined FOV 126 that is directed rearward of the tailgate assembly 32. While actuator 120 is illustrated, the tailgate video camera may be manually adjustable. In some embodiments, the tailgate video camera may be stationary and the FOV altering device may be moved to adjust the FOV between tailgate raised and lowered configurations.

The above-described vehicle video systems provide one or more rear tailgate video cameras that can be used to provide a suitable FOV with tailgate assemblies in both raised and lowered configurations. Such arrangements can provide suitable FOVs for the driver, even when driving with the tailgate assembly in the lowered configuration.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a vehicle body having a cabin area and a cargo area including a truck bed assembly;
    a tailgate assembly that is pivotally connected to the truck bed assembly at a location between a pair of tailgate posts, the tailgate assembly being moveable between a raised configuration and a lowered configuration; and
    a vehicle video system comprising:
        a first rear video camera located on the tailgate assembly that captures a first field of view at least partially rearward of a rear bumper assembly of the vehicle body with the tailgate assembly in the raised configuration; and
        a second rear video camera located on the tailgate assembly that captures a second field of view rearward of the tailgate assembly with the tailgate assembly in the raised configuration,
        wherein the first rear video camera and the second rear video camera are two rear video cameras each configured to provide different angles of field of view than the other rear video camera with the tailgate assembly in both the raised configuration and the lowered configuration.

2. The vehicle of claim 1 comprising a tailgate handle assembly that comprises the first and second rear video cameras.

3. The vehicle of claim 1, wherein the vehicle video system includes an electronic control unit that controls operation of the first rear video camera and the second rear video camera based on an input from a sensor.

4. The vehicle of claim 3, wherein the sensor is a tailgate position sensor that provides a signal to the electronic control unit that is indicative of a position of the tailgate assembly.

5. The vehicle of claim 4, wherein the electronic control unit includes logic that activates the first rear video camera with the tailgate in the raised configuration and activates the second rear video camera with the tailgate in the lowered configuration.

6. The vehicle of claim 1, wherein the second rear video camera is carried at an outer edge of the tailgate assembly.

7. A truck comprising:
    a vehicle body having a cabin area and a cargo area including a truck bed assembly;
    a tailgate assembly that is pivotally connected to the truck bed assembly at a location between a pair of tailgate posts, the tailgate assembly being moveable between a raised configuration and a lowered configuration;
    a vehicle video system comprising a rear video camera connected to the tailgate assembly; and
    a field of view altering device located between the rear video camera and an outer edge of the tailgate assembly and comprising at least one of a lens and a mirror that changes a field of view for the rear video camera through the tailgate assembly and directed rearward of the tailgate assembly with the tailgate assembly in the lowered configuration and the rear video camera in the tailgate lowered position;
    wherein at least one of the rear video camera and the field of view altering device is moveable between a tailgate raised position and a tailgate lowered position.

8. The truck of claim 7, wherein the vehicle video system includes an electronic control unit that controls movement of the at least one of the rear video camera and the field of view altering device between the tailgate raised position and the tailgate lowered position using an actuator.

9. The truck of claim 8, wherein the electronic control unit controls movement of the at least one of the rear video camera and the field of view altering device based on an input from a tailgate position sensor.

10. The truck of claim 8, wherein the electronic control unit includes logic that activates the rear video camera with the tailgate assembly in the lowered configuration.

11. The truck of claim 7, wherein the field of view of the rear video camera with the tailgate assembly in the raised configuration is different from the field of view of the rear video camera with the tailgate assembly in the lowered configuration.

12. The truck of claim 7, wherein the field of view altering device comprises a lens.

* * * * *